United States Patent [19]
Hayashi

[11] Patent Number: 5,729,972
[45] Date of Patent: Mar. 24, 1998

[54] ENGINE EXHAUST PURIFYING DEVICE

[75] Inventor: Kaoru Hayashi, Wako, Japan

[73] Assignee: Honda Giken Kogyo Kabushiki Kaisha, Tokyo, Japan

[21] Appl. No.: 523,768

[22] Filed: Sep. 5, 1995

[30] Foreign Application Priority Data

Sep. 5, 1994 [JP] Japan .................. 6-211604

[51] Int. Cl.⁶ ........................ F01N 3/28
[52] U.S. Cl. ........................ 60/299; 422/180
[58] Field of Search ............... 60/299; 422/180

[56] References Cited

U.S. PATENT DOCUMENTS

| 5,104,627 | 4/1992 | Usui | 60/299 |
| 5,151,254 | 9/1992 | Arai | 60/299 |

FOREIGN PATENT DOCUMENTS

| 0 473 081 | 3/1992 | European Pat. Off. |
| 0 431 405 | 6/1992 | European Pat. Off. |
| 2460709 | 1/1981 | France |
| 3715040 | 11/1987 | Germany |
| 3-85316 | 4/1991 | Japan |
| 4-116219 | 4/1992 | Japan |

OTHER PUBLICATIONS

Patent Abstracts of Japan, vol. 010, No. 273, Sep. 17, 1986 re JP 61-096120, May 14, 1986.

*Primary Examiner*—Douglas Hart
*Attorney, Agent, or Firm*—Merchant, Gould, Smith, Edell, Welter & Schmidt, P.A.

[57] ABSTRACT

An engine exhaust purifying device is positioned at a connection between an exhaust pipe and an expanded pipe, which is located upstream of an oil reservoir and below an engine, and includes an outer pipe and an inner pipe joined together to form a dual-pipe structure, the outer pipe being weld connected at its reduced-diameter portion to a fuse connection portion of the inner pipe, the fuse connection portion carrying no ventholes and a catalyst layer thereon and the exhaust purifying device being enclosed by a heat insulating protector.

10 Claims, 5 Drawing Sheets

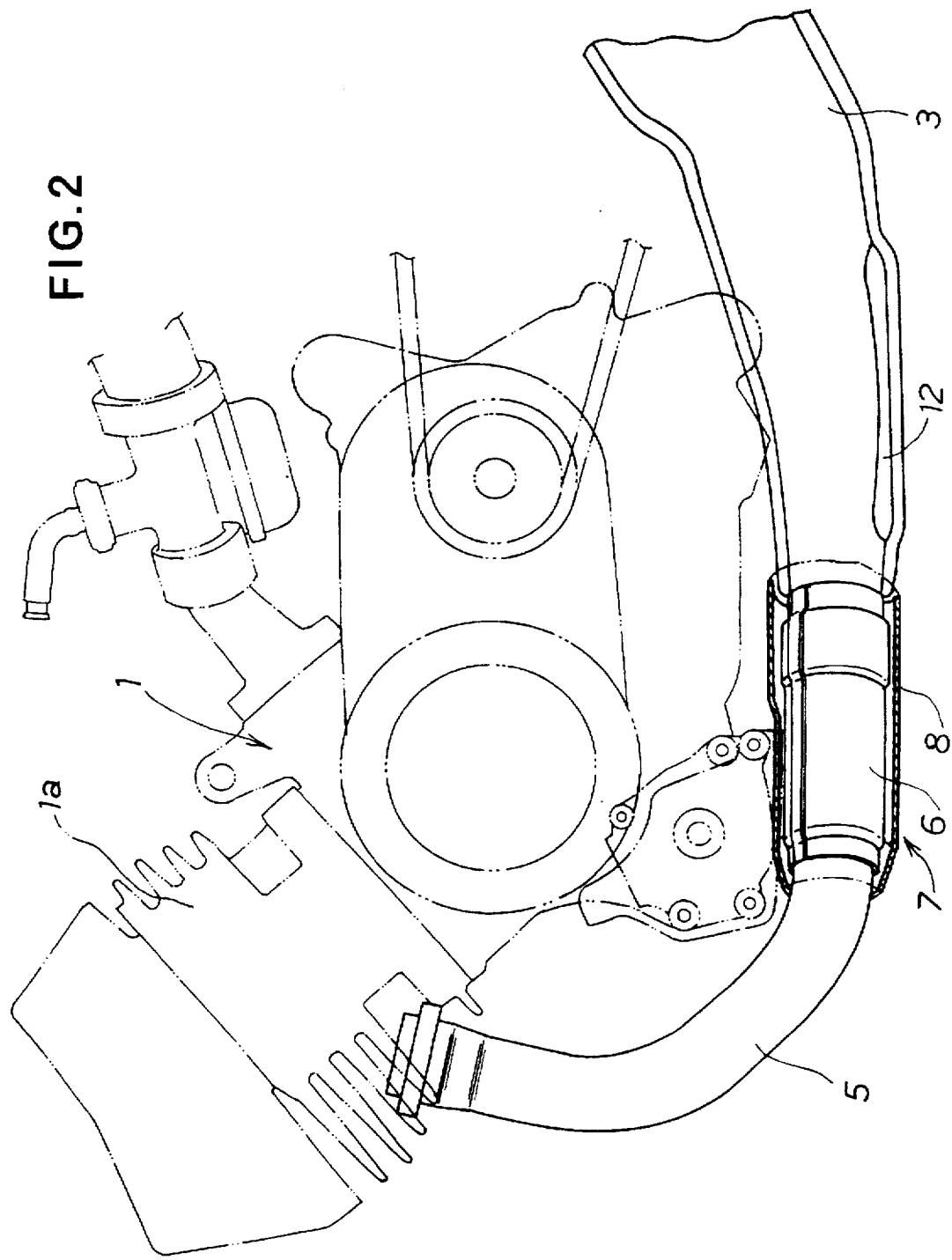

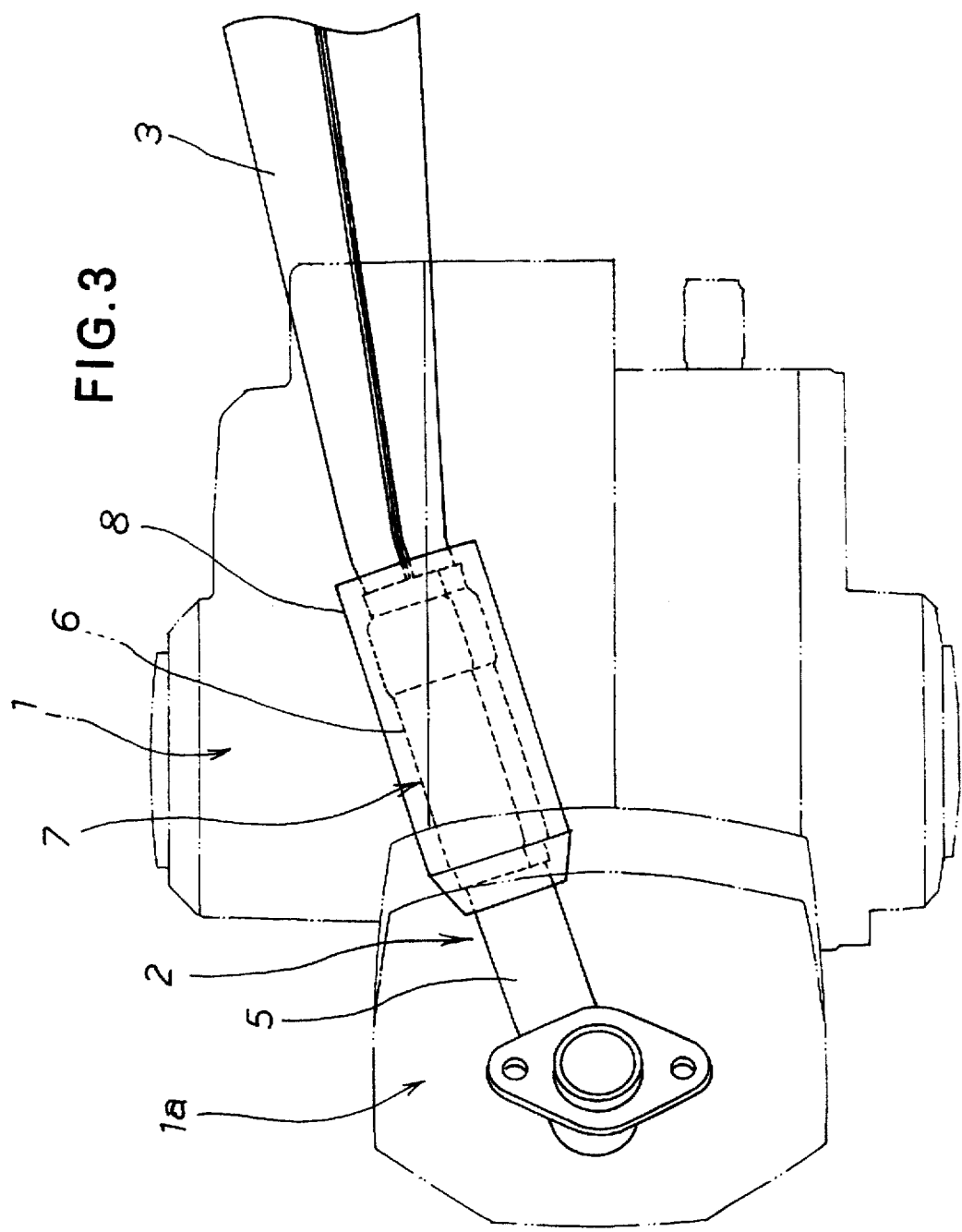

ENGINE EXHAUST PURIFYING DEVICE

BACKGROUND OF THE INVENTION

1. Field of the Invention

The present invention relates generally to engine exhaust purifying devices for use with two-cycle engines or the like, and more particularly to an engine exhaust purifying device which has an increased mechanical strength and an enhanced exhaust purifying capability.

2. Description of the Related Art

Japanese Patent Laid-open Publication NO. 3-85316 discloses an exhaust purifying device for use with a motorcycle engine, which comprises a metal pipe disposed within an exhaust pipe of the engine so as to provide a dual-pipe structure. The metal pipe is formed by assembling two metal plates, each having a multiplicity of ventholes, into a pipe shape. Uneven surface layers are formed on the inner and outer surfaces of the metal pipe by spraying a molten ceramic material thereonto, and catalyst solution is additionally applied on the layered inner and outer surfaces.

However, the exhaust purifying device disclosed in the publication has the problem that the metal pipe can be welded to the exhaust pipe only with a limited bonding strength because the area of the metal pipe which is actually welded to the exhaust pipe is considerably limited due to the presence of the multiple ventholes.

Japanese Patent Laid-open Publication NO. 4-116219, for example, discloses another type of the exhaust purifying device which attempts to provide a solution to the above-mentioned problem. Specifically, this exhaust pipe purifying device is characterized in that in order to increase the bonding strength between the metal pipe and the exhaust pipe, the catalyst-bearing metal pipe disposed within the exhaust pipe has no ventholes formed in the portion thereof to be welded to the exhaust pipe.

In the case where some catalyst is applied to the metal pipe, it is generally customary to increase the adherence of the catalyst by providing an uneven surface layer on the metal pipe as shown in the above-noted Japanese Patent Laid-open Publication NO. 3-85316. However, in this case as well, the catalyst-bearing metal pipe can not be secured or bonded firmly to the exhaust pipe because the unevenness in the catalyst-bearing surface would decrease the bonding strength.

Further, the metal pipe welded only along the axial surface thereof would be easily detached from the exhaust pipe due to repetition of its axial thermal expansion and contraction. In addition, because the metal pipe is formed by joining together two separate metal plates, there are many portions to be joined so that the joining work becomes very complicated. Furthermore, the purifying device must be provided accurately in such an optimum position as to achieve a sufficient exhaust purifying capability and to prevent emission of undesirable white smoke due to unburned or non-combusted oil and deterioration of the engine performance.

SUMMARY OF THE INVENTION

It is therefore an object of the present invention to provide an engine exhaust purifying device which has an increased mechanical strength and an enhanced exhaust purifying capability.

To accomplish the above-mentioned object, an engine exhaust purifying device in accordance with a first aspect of the present invention comprises an inner pipe adapted to be attached within an exhaust pipe of an engine, the inner pipe having a multiplicity of ventholes formed in selected areas thereof and an outer surface coated with a catalyst, and a catalyst-free surface portion provided on a specific region of the outer surface of the inner pipe which is positioned off the selected area where the ventholes are formed. The purifying device thus arranged is welded at the catalyst-free surface portion to the exhaust pipe of the engine.

Further, an engine exhaust purifying device in accordance with a second aspect of the present invention comprises an inner pipe adapted to be attached within an exhaust pipe of an engine, the inner pipe having a multiplicity of ventholes formed therein and an outer surface coated with a catalyst, the ventholes being formed only in selected areas of the inner pipe where engine exhaust gas is allowed to flow via the ventholes into and out of the inner tube, the catalyst coating an outer surface of the selected areas, and a catalyst-free surface portion provided on a specific region of the outer surface of the inner pipe which is positioned off the selected area where the ventholes are formed. The purifying device thus arranged is also welded at the catalyst-free surface portion to the exhaust pipe of the engine.

The catalyst-free surface portion may be formed along an outer circumference of said inner pipe, and the inner pipe may comprise a single plate rolled into a pipe shape. Further, the purifying device may be disposed upstream of an oil reservoir provided in a lowermost portion of an exhaust passage connected to the engine. In addition, the purifying device may be provided in proximity to the engine via a heat-blocking protector.

The purifying device of the invention can be welded at the catalyst-free surface portion to the exhaust pipe of the engine with highly increased bonding strength, because the catalyst-free surface portion has no substantial unevenness and is positioned off the venthole-formed areas to thereby provide a smooth bonding surface of a sufficiently large area.

In the case where the catalyst-free surface portion is provided along the outer circumference of the inner pipe and hence the purifying device is welded along this outer circumference, no significant adverse effects will result even if axial expansion and contraction of the inner pipe relative to the exhaust pipe are repeated due to a difference in thermal expansion rate between the two components. In addition, where the inner pipe is formed of a single plate, the number of portions to be joined can substantially reduced, which will highly facilitate the joining work necessary.

Further, in two-cycle engines for motorcycles or the like, if unburned oil gets into the exhaust pipe to stick to the inner wall surface of the purifying device or accumulate within the purifying device, the purifying capability of the device would deteriorate to promote emission of white smoke and deterioration of the engine performance. The present invention provides a good solution to this problem by positioning the engine exhaust purifying device upstream of the oil reservoir. In addition, the device can considerably be reduced in size by positioning the purifying device, and adverse effects on the engine system by excessive heat can be avoided by a heat-blocking protector.

BRIEF DESCRIPTION OF THE ACCOMPANYING DRAWINGS

FIG. 2 is an enlarged fragmentary view of the engine exhaust purifying device of FIG. 1;

FIG. 3 is a schematic plan view of the purifying device shown in FIG. 2;

Figure 4A:
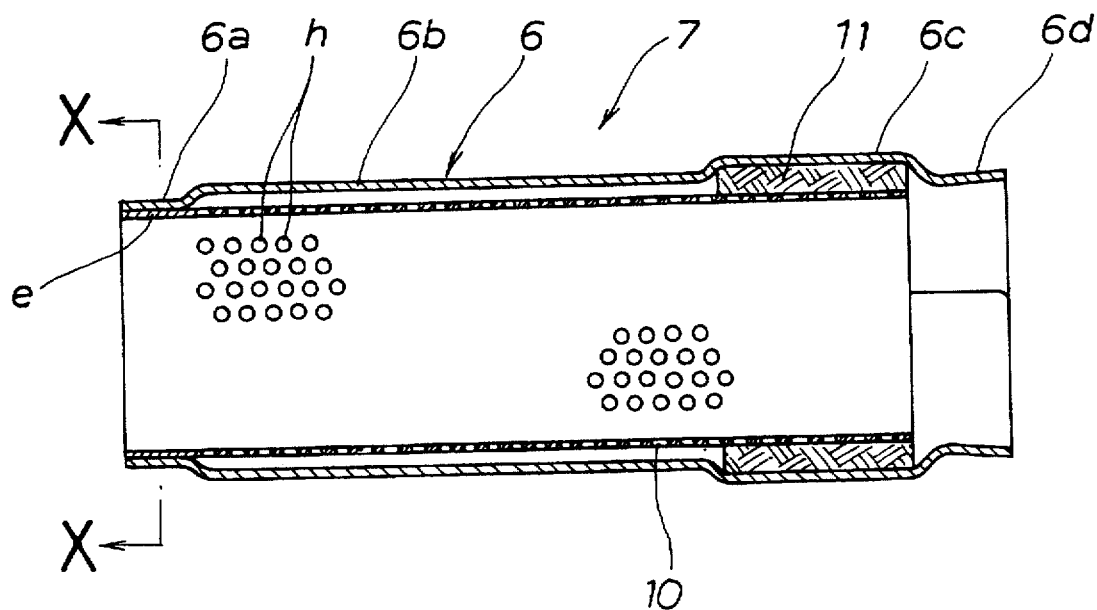
Figure 4B:
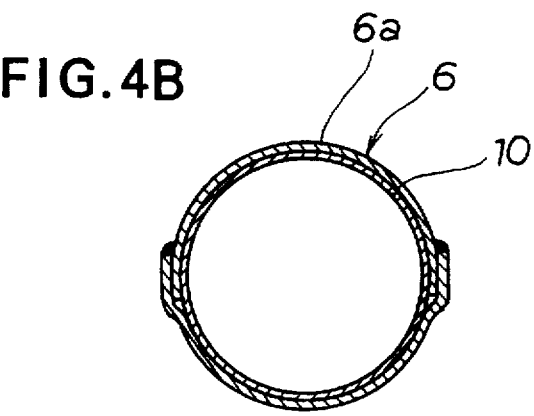
Figure 5A:
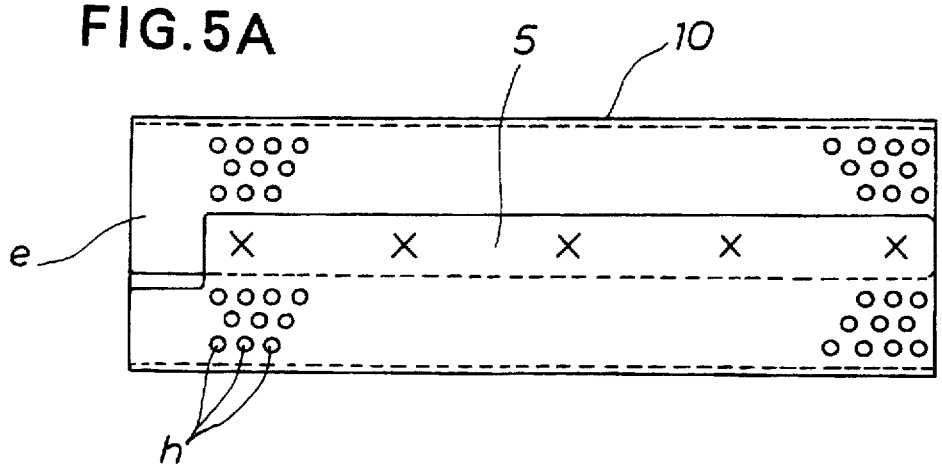
Figure 5B:
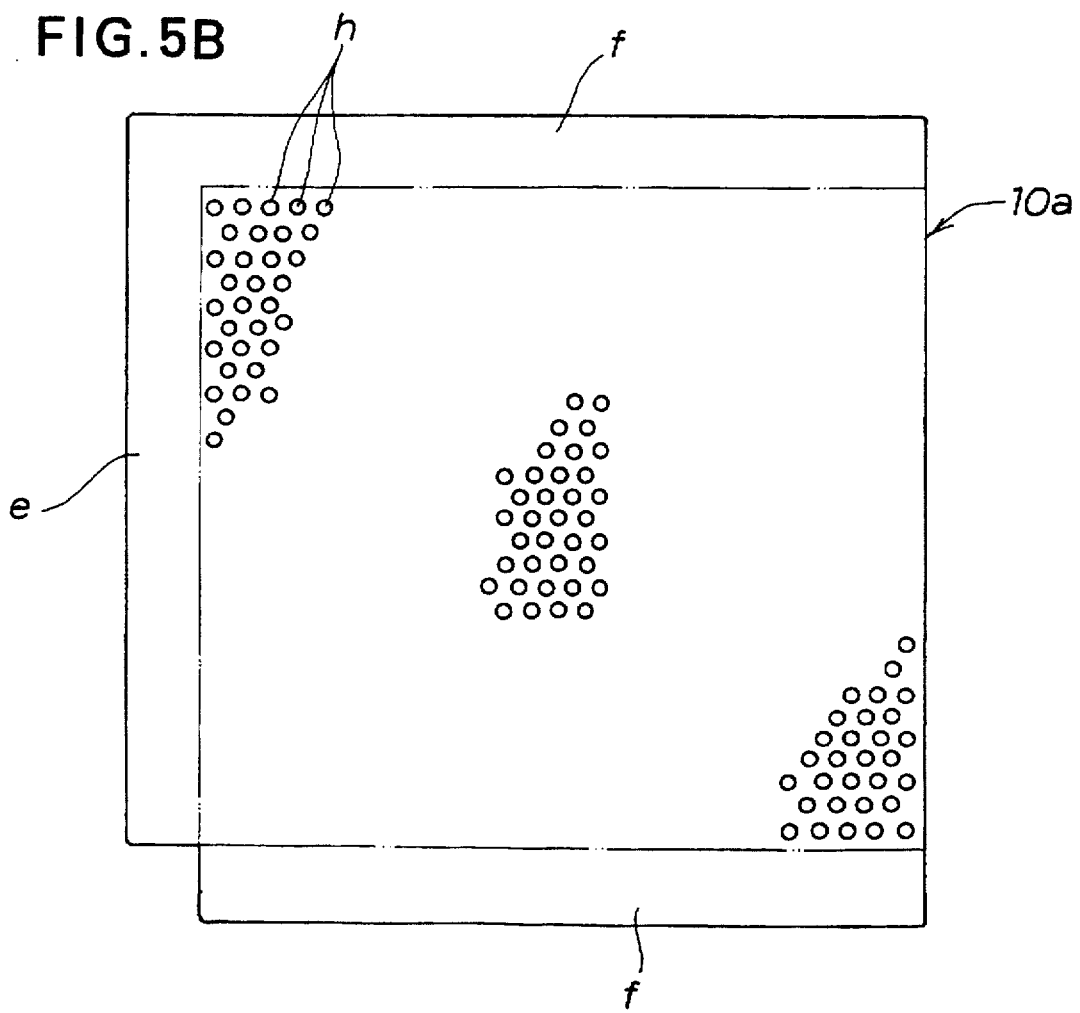

FIG. 4A isle sectional view of the purifying device;

FIG. 4B is a sectional view of the purifying device taken along line X—X of FIG. 4A;

FIG. 5A is a view showing an inner pipe forming plate in a cylindrically rolled state, and FIG. 5B is a view showing the plate of FIG. 5A in an unrolled state.

DETAILED DESCRIPTION OF THE PREFERRED EMBODIMENTS

Figure 1:
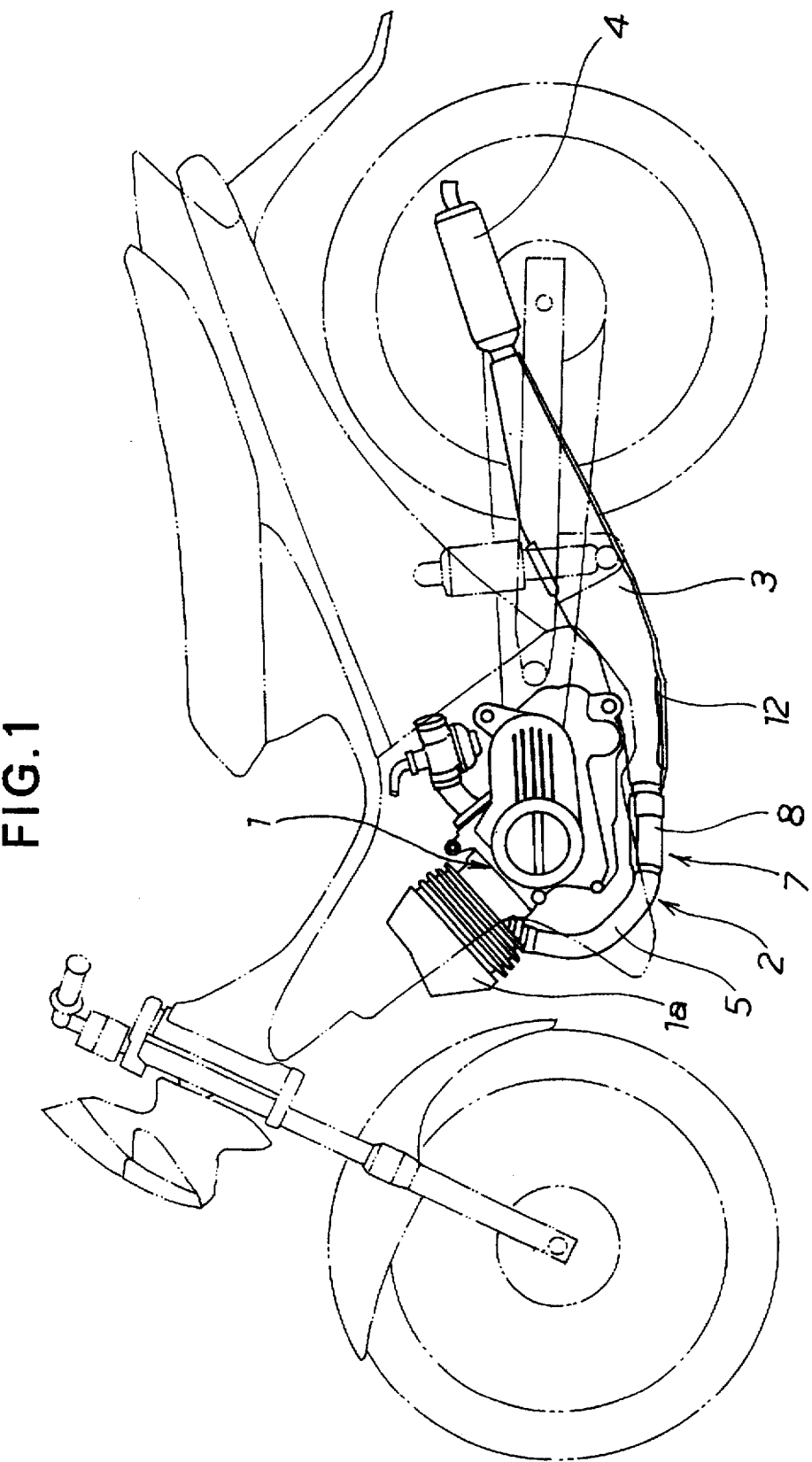
FIG. 1 is a schematic view showing the general arrangement of a motorcycle to which is applied an engine exhaust purifying device of the present invention.

The engine exhaust purifying device according to the invention will now be described with particular reference to FIG. 1 showing schematically an entire motorcycle employing an engine exhaust purifying device of the invention, FIG. 2 showing, on an enlarged scale, part of the engine exhaust purifying device, and FIG. 3 showing schematically, in top plan, the device shown in FIG. 2.

As shown in FIG. 1–FIG. 3, an exhaust system of a motorcycle engine 1 comprises an exhaust pipe 2 which extends downwardly from a cylinder 1a and then rearwardly rightwardly of the motorcycle, an expanded pipe 3 connected to the exhaust pipe 2 and extending rearwardly of a motorcycle body along the right side thereof, and a muffler 4 connected to the expanded pipe 3, the exhaust pipe 2 consisting of an exhaust tube 5 disposed proximate to the engine 1 and an outer pipe 6 (FIG. 2) located proximate to the expanded pipe 3.

The engine exhaust purifying device 7 according to the invention is located on the underside of the engine 1 close to the outer pipe 6 and is externally covered by a protector 8 for heat insulation, as shown in FIG. 2 and FIG. 3. The protector 8 prevents components of the engine from being adversely affected by heat.

As seen from FIGS. 4(A) and 4(B), the engine exhaust purifying device 7 is comprised of the outer pipe 6, an inner pipe 10 disposed within the outer pipe 6, and a mesh member 11 interposed between the outer pipe 6 and inner pipe 10 for serving as a spacer, the outer pipe 6 consisting of two divided sections joined together to form a cylindrical configuration and having an inner diameter varying along an axis thereof, as shown in FIG. 4(B). As shown in the figure, the outer pipe 6 has at its leading end a reduced-diameter portion 6a for receiving therein a trailing end of the exhaust tube 5, as well as an intermediate portion 6b with an inner diameter designed to present a clearance of a predetermined size between the intermediate portion and the inner pipe 10. It also has at its trailing end an increased-diameter portion 6c for allowing interposition of the mesh member 11, as well as an extreme end with a diameter which allows insertion of the extreme end into the expanded pipe 3.

The inner pipe 10 is connected along the inner periphery of the reduced-diameter portion 6a of the outer pipe 6 by spot welding or the like and is thus retained in a cantilever fashion. Such cantilever fashion arrangement is to avoid inconveniences which may result from the differences between the levels of thermal expansion and contraction of the outer pipe 6 and inner pipe 10 along axes thereof. The changes of the clearance between the outer pipe 6 and inner pipe 10 at the non-retained trailing end of the inner pipe 10 may be dampened by the mesh member 11. The mesh member 11 has bellows-like turn-ups so that it may constrict the inner pipe 10 radially inwardly and allow axial movement of the same.

The inner pipe 10 is formed from rolling a punched or porous plate 10a into a cylindrical configuration. As shown in FIG. 5(B), the punched plate 10a, in its unfolded state, takes the form of a rectangle with one corner slightly cut away. One side edge e of the plate serves as a welded connection portion and two opposed side edges adjacent to the one side edge e serve as overlapping portions f, f. By rolling the punched plate 10a such that the overlapping portions f, f are laid one over the other, the cylindrical form as shown in FIG. 5(A) may be obtained.

The punched plate 10a also has a multiplicity of ventholes in areas other than those where the welded connection portion e and overlapping portions f, f are located. The plate else carries a coating of catalyst in areas apart from that of the welded connection portion e.

In its manufacture, the plate is punched to have a multiplicity of ventholes h, h, . . . spread over the entire area except for the welded connection portion e and overlapping portions f, f. With the upper and lower, or top and bottom, surfaces of the welded connection portion e covered by a masking tape, it then undergoes a process in which the remaining upper and lower, or top and bottom, surfaces of the plate are toughened, whereafter the surfaces are coated with a catalyst consisting of a noble material, e.g., platinum (Pt), mixed with a small quantity of rhodium (Rh). Thus, the surfaces of the welded connection portion e are catalyst-free areas while the remaining surfaces of the plate are catalyst coated or layered areas.

As the punched plate 10a thus completed is rolled to present a cylindrical form as shown in FIG. 5(A), the welded connection portion (catalyst-free area) e will be positioned circumferentially of the inner pipe. Further, no overlapping portions will be formed at the welded connection portion e. Thereafter, the overlapping portions are connected by spot welding at points marked x, as shown in FIG. 5(A).

For connecting the inner pipe 10 to the outer pipe 6, the outer periphery of the welded connection portion e of the inner pipe 10 will be held in tight contact with the inner periphery of the reduced-diameter portion 6a of the outer pipe 6, whereafter they are welded together by spot welding or the like. As a result, no ventholes h, h, . . . will appear at the welded connection portion e and the outer surfaces will be smooth, achieving increased strength at the connection.

Turning back to FIG. 2, the expanded pipe 3 has an oil reservoir 12, which is designed to collect non-combusted oil contained in an exhaust gas from the engine so as to prevent the oil from producing a white smoke and from sticking to a tail pipe. Such reservoir is normally disposed at that portion of an exhaust passage which is closest to the ground level.

Oil accumulated in the reservoir 12 to a predetermined level may be pulled out from an oil drainage aperture not shown or may be fed through a pipe connected with the aperture for reuse as a lubricant.

The engine exhaust purifying device 7 is located upstream of the oil reservoir 12 and positioned higher than the height of the latter. Consequently, when non-combusted oil sticks to the exhaust purifying device 7, the oil may be flushed down to the reservoir by a flow of gas, thus avoiding undesired accumulation at and adhesion to the device of non-combusted oil. With the arrangement, it is also possible to avoid production of a white smoke and deterioration of engine performance.

In operation, the gas exhausted from the engine 1 is fed through the exhaust pipe 2 to the expanded pipe 3. As it passes through the exhaust purifying device 7, the exhaust gas contacts the catalyst of the inner pipe 10 and exhibits an oxidation reaction, resulting in purification of the non-combusted portion of the exhaust gas.

Although it experiences high and low temperature conditions repeatedly, the exhaust purifying device constructed as explained above is durable and strong against expansion/contraction due to the difference in the ratios of thermal expansion of the components, and against vibrations and shocks. This is because the welded connection portion e of the inner pipe 10 has no ventholes h, h, . . . but smooth catalyst-free surfaces which enable provision of increased connection strength. Further, since it is retained in a cantilever fashion, the inner pipe 10 may avoid application of axial force thereto.

Since it is comprised of a single sheet of punched plate, the inner pipe 10 may be manufactured by simply weld connecting the overlapping portions f, f, resulting in easy operations.

By positioning the exhaust purifying device 7 upstream of the oil reservoir 12, it becomes possible to avoid adhesion of non-combusted oil to the device and to suppress the undesired occurrence of white smoke and deterioration of engine performance. Further, since it is positioned below the engine 1, the arrangement may be rendered compact. While it is desirable to maintain the catalyst at a high temperature to accelerate the purification operation, the resulting heat can be insulated by the protector 8, thus avoiding adverse effects which may otherwise be applied to the engine components.

As hitherto explained, the exhaust purifying device according to the invention assures strengthened connection with the exhaust pipe and a prolonged life in that it comprises the catalyst-free surfaces provided at areas devoid of the ventholes of part of the inner pipe for serving as the welded connection with the exhaust pipe, a multiplicity of the ventholes at portions of the inner pipe where air can freely pass through, and a layer of catalyst coated over those portions only, avoiding the catalyst free areas.

Since the catalyst-free surfaces are formed to extend circumferentially of the inner pipe, it is also possible to avoid effects resulting from the differences in the levels of thermal expansion of the inner pipe and exhaust pipe.

Further, since the inner pipe may be formed from a single sheet of punched plate, the operation of the manufacture of the pipe is simplified.

Moreover, since the exhaust purifying device is positioned upstream of the oil reservoir, its purification efficiency may not be deteriorated. By positioning the device below the engine, it is possible to prevent the engine and exhaust system from becoming bulky.

What is claimed is:

1. An engine exhaust purifying device comprising:

an inner pipe adapted to be attached within an exhaust pipe of an engine, said inner pipe having a multiplicity of ventholes formed in selected areas thereof and an outer surface coated with a catalyst, and a catalyst-free surface portion provided on a specific region of the outer surface of said inner pipe which is positioned off said selected area where the ventholes are formed, wherein said purifying device is welded at said catalyst-free surface portion to the exhaust pipe of the engine.

2. An engine exhaust purifying device as defined in claim 1, wherein said catalyst-free surface portion is formed along an outer circumference of said inner pipe.

3. An engine exhaust purifying device as defined in claim 1, wherein said inner pipe comprises a single plate rolled into a pipe shape.

4. An engine exhaust purifying device as defined in claim 1, wherein said devise is adapted to be disposed upstream of an oil reservoir provided in a lowermost portion of an exhaust passage connected to the engine.

5. An engine exhaust purifying device as defined in claim 1, wherein said device is adapted to be provided in proximity to the engine via a heat-blocking protector.

6. An engine exhaust purifying device comprising:

an inner pipe adapted to be attached within an exhaust pipe of an engine, said inner pipe having a multiplicity of ventholes formed therein and an outer surface coated with a catalyst, said ventholes being formed only in selected areas of said inner pipe where engine exhaust gas is allowed to flow via said ventholes into and out of said inner tube, said catalyst coating an outer surface of said selected areas, and a catalyst-free surface portion provided on a specific region of the outer surface of said inner pipe which is positioned off said selected area where the ventholes are formed, wherein said purifying device is welded at said catalyst-free free surface portion to the exhaust pipe of the engine.

7. An engine exhaust purifying device as defined in claim 6 wherein said catalyst-free surface portion is formed along an outer circumference of said inner pipe.

8. An engine exhaust purifying device as defined in claim 6, wherein said inner pipe comprises a single plate rolled into a pipe shape.

9. An engine exhaust purifying device as defined in claim 6, wherein said device is adapted to be disposed upstream of an oil reservoir provided in a lowermost portion of an exhaust passage connected to the engine.

10. An engine exhaust purifying device as defined in claim 6, wherein said device is adapted to be provided in proximity to the engine via a heat-blocking protector.

* * * * *